Aug. 16, 1955  J. F. KIERNAN  2,715,551
APPARATUS FOR DISPENSING POWDERED MATERIALS
AT SUPERATMOSPHERIC PRESSURE
Filed Dec. 9, 1952  2 Sheets-Sheet 1

INVENTOR
JOSEPH F. KIERNAN
BY
H. Hume Mathews
ATTORNEY

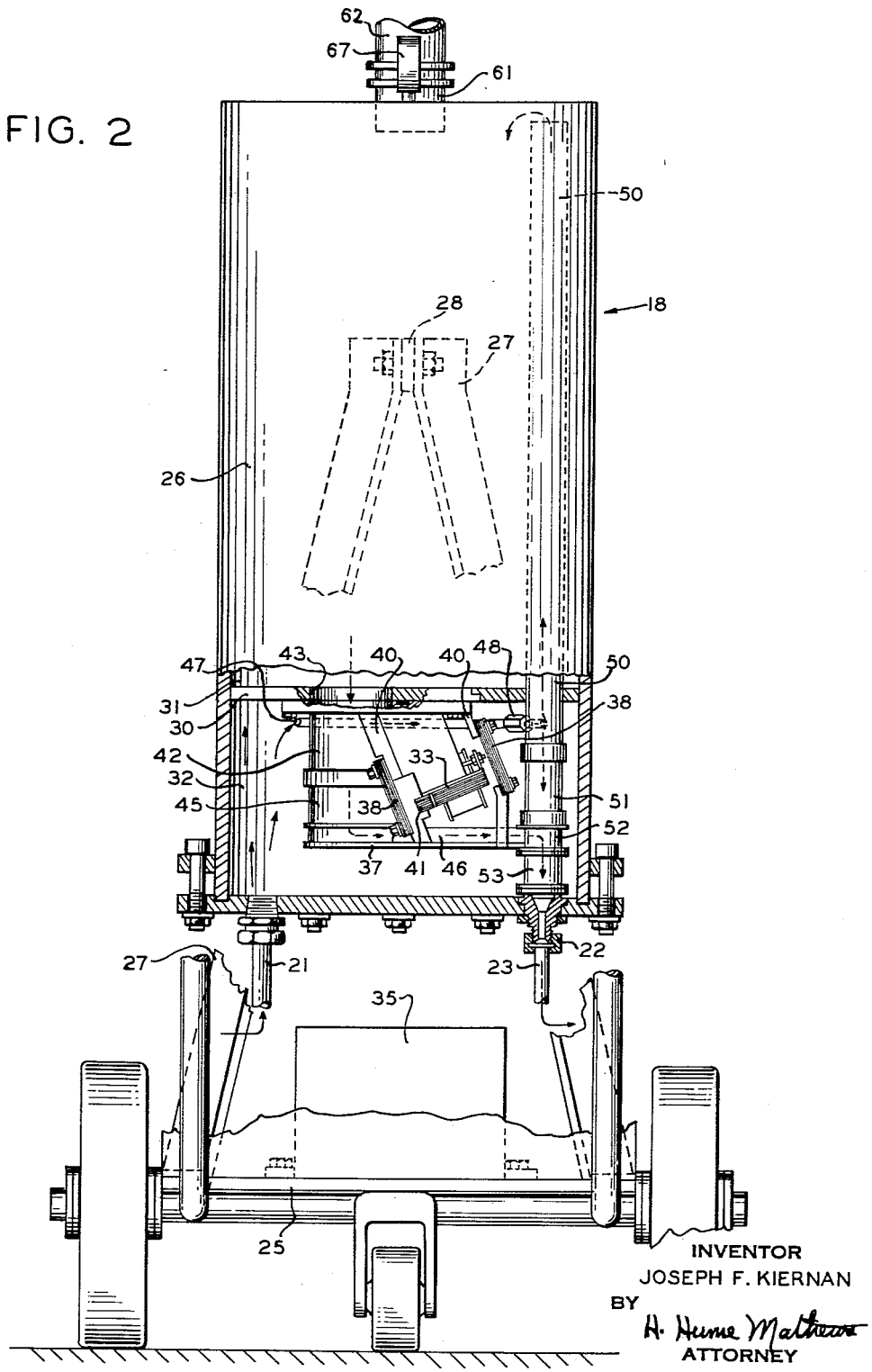

United States Patent Office 2,715,551
Patented Aug. 16, 1955

2,715,551

APPARATUS FOR DISPENSING POWDERED MATERIALS AT SUPERATMOSPHERIC PRESSURE

Joseph F. Kiernan, Dunellen, N. J., assignor to Air Reduction Company, Incorporated, New York, N. Y., a corporation of New York Application December 9, 1952, Serial No. 324,991

1 Claim. (Cl. 302—55)

This invention relates to apparatus for feeding powdered material into a flowing gas stream for mixing with and entrainment by the gas.

There are many industrial applications in which it is necessary to entrain dry powdered material in a flowing gas stream. One such application is in oxy-acetylene cutting where it has been found advantageous to add a "flux" such as sodium bicarbonate or iron powder to the cutting gas to promote the cutting action on certain materials such as stainless steels or for certain cutting operations where the cut must be maintained across several reentrant sections. Such a process is disclosed in Linnert Patent No. 2,454,325 issued November 23, 1948. Another application of the use of apparatus of the type to be disclosed herein is in the treatment of molten metals such as the process of desulfurizing ferrous metals by the injection of pulverized calcium carbide into the molten metal bath with a carrier gas. Such a process is disclosed in Hulme Patent No. 2,577,764 issued December 11, 1951.

An object of this invention is to provide a method and apparatus for continuously dispensing powdered material into a flowing gas stream for entrainment thereby that will permit the powdered material to be dispensed without interruption for unlimited periods at a uniform rate that is independent of the gas pressure or the rate of gas flow.

Figure 2 is a view on an enlarged scale and partially broken away of the powder dispensing unit forming part of the apparatus of Figure 1.

Figure 1:
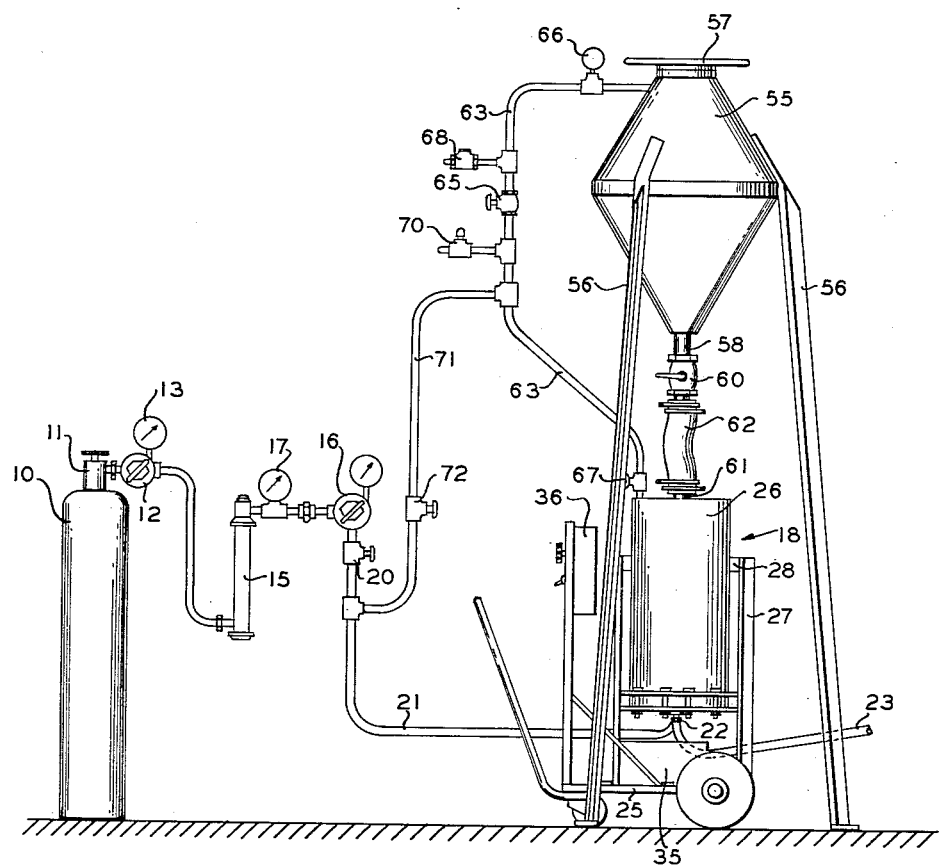
Figure 1 illustrates apparatus according to the present invention for the continuous feeding of powdered material into a flowing gas stream at superatmospheric pressure.

Referring to Figure 1 carrier gas may be supplied to the system from any suitable source such as compressed gas cylinder 10. Gas from this cylinder is admitted to the system through cylinder valve 11 and pressure reducing valve (pressure regulator) 12. Pressure gauge 13 indicates the cylinder pressure. Flowmeter 15 inserted in the gas line downstream of regulator 12 and upstream of a regulator 16 indicates the rate of carrier gas flow. Pressure gauge 17 indicates the gas pressure in the flowmeter section of the gas line. By positioning the flowmeter in the constant pressure section of the system, a single calibration will indicate the gas flow correctly under a wide variety of operating conditions. Regulator 16 reduces the pressure of the gas further to the pressure at which it is delivered to the powder dispensing unit 18 and which ultimately controls the delivery pressure to the particular process being carried out. Shutoff valve 20 is provided just downstream of regulator 16. Carrier gas supplied from the above described system enters the powder dispensing unit 18 from the bottom through connecting tube 21. The gas emerges from the dispensing unit with the powdered material suspended in the carrier gas through fitting 22, also in the bottom of the unit 18, and is delivered to the process being performed through tube 23.

The powdered material dispensing unit 18 is best described with reference to Figure 2. The unit consists of a base 25 comprising a tricycle support. A cylindrical pressure vessel 26 is mounted above the base 25 by means of angle iron supports 27 bolted to ears 28 on either side of the pressure vessel 26. The cylindrical pressure vessel 26 is divided into upper and lower pressure-tight compartments by dividing wall 30. The volume 31 above the wall is the powder supply hopper. The volume 32 below the wall houses the motor mechanism for feeding the powdered material and the actual powder feeding and powder-gas mixing elements.

The feed mechanism comprises principally an electromagnetic vibratory motor having a magnet 33 mounted to the underside of the dividing wall 30 of the vessel 26. The electromagnet 33 is magnetized by alternating current supplied from a constant voltage transformer 35 through a variable output auto transformer 36 (Figure 1). A delivery platform 37 is suspended from the underside of the dividing wall 30 by three leaf springs 38 mounted at an angle to the wall and bolted to appropriate mounting brackets 40. The armature 41 of the magnetic vibratory motor is rigidly connected to the suspended platform structure. When the magnetic motor is energized by alternating current or pulsating direct current, the armature 41 is intermittently attracted toward the magnet 33 causing the suspended platform 37 to vibrate with respect to the vessel 26. Such relative motion is possible because of the leaf springs 38, connecting the platform 37 and the vessel 26, which springs are periodically deflected by the force of the magnetic attraction. An outlet tube 42 is secured to the dividing wall 30 to cooperate with an outlet opening 43 in such wall and thus permit the powdered material to discharge by gravity from the upper portion 31 of the vessel 26 which constitutes the powder supply hopper. A flexible tube 45 is connected by a gastight connection to the discharge side of this outlet tube 42 and provides a gastight conduit for delivery of powder from the hopper 31 to the vibrating delivery platform 37. The delivery platform 37 is substantially horizontal but because of the angular relationship of the vibrator motor and the supporting leaf springs 38 its vibratory motion is in an inclined plane approximately perpendicular to the laminations of the leaf springs. The powder channel 46 of the delivery platform 37 is fully enclosed, and in this particular device it is rectangular in cross section. Both the pressure vessel 26 and the platform 37 will vibrate when the magnetic motor is energized. The magnitude of vibration of the platform will be great with respect to the magnitude of vibration of the hopper, since the mass of the hopper is many times that of the delivery platform. As a result of such vibration, powder will be fed from the hopper 31 through hopper outlet tube 42 and the flexible tube 45 to the delivery platform 37 where it is "walked" the length of the platform and discharged from the end of the powder channel.

The carrier gas entering the dispensing unit through conduit 21 fills the entire lower pressure-tight compartment 32 of the pressure vessel 26 in which compartment the above described vibrator, delivery platform, and accessories are mounted. The gas discharges from this chamber through pipe 47 and check valve 48 into a vertical mixing and pressure equalizing conduit 50. This pipe 50 extends through the dividing wall 30 and is open ended near the top of the hopper 31. Just below the point at which gas enters the pipe 50 from pipe 47 and check valve 48, a length of flexible tubing 51 is inserted connecting the upper portion of the pipe 50 to another rigid section 52 which makes a gastight T-joint with the delivery platform powder channel 46. Just below the rigid portion 52 into which the delivery platform feeds powdered material is another section of flexible tubing 53 which is hermetically sealed to the outlet fitting 22 which in turn is connected to the delivery pipe 23 leading to the process for which this apparatus is employed. Flexible tubes 51 and 53 and T-section 52 constitute extending portions of the vertical mixing and pressure equalizing conduit 50.

The normal flow of gas through the above-described apparatus occurs in the following manner. Gas enters the bottom of the pressure vessel 26 through tube 21 and is free to circulate in lower chamber 32 from which it discharges through pipe 47 and check valve 48 into pipe 50. After entering pipe 50, the gas flows downwardly past the delivery platform discharge and through the outlet fitting 22 and outlet tube 23. Gas is free to flow upwardly in the pipe 50 and fill the voids in the carbide hopper, which flow ceases as soon as the pressure in the hopper 31 reaches the system pressure. In normal operation the only flow of gas into the hopper 31 is that which is necessary to displace the powdered material that is being discharged from the hopper.

When the above-described powder dispensing and gas supply systems are operated simultaneously, a uniform supply of powder is delivered into the gas stream as the gas passes the end of the powder chamber 46 on the delivery platform 37 in the lower portion of the pipe 50. The volume of gas delivered by the system is readily adjustable by manipulation of regulator 16 and valve 20. The quantity of powder fed into such flow of gas may be controlled by adjusting the variable output auto transformer 36 which varies the amplitude of vibration of the vibratory motor and thus controls the rate of delivery of the powder to the gas stream. The above described apparatus is more fully disclosed in an application filed on even date herewith in the name of Nelson E. Anderson and entitled Powder Dispensing Apparatus.

With the apparatus thus far described, the process for which this device is employed may be kept continuously operating only as long as the supply of powdered material in the dispenser hopper lasts. To increase the capacity of the system or to make it continuously operating for an indefinite length of time, an auxiliary hopper is supported above the dispensing unit in such a manner that the supply in the dispensing hopper can be replenished during operation.

Referring to Figure 1 an auxiliary hopper 55 is supported on a tripod base 56 above the dispensing unit heretofore described in detail. This auxiliary hopper 55 is a simple pressure vessel having a pressure-tight head 57 and pressure-tight discharge fittings 58 at the bottom which are terminated in a valve 60 of suitable construction. This valve should open wide and provide a straight run for material through it. Since this auxiliary hopper 55 is not vibrated the hopper walls are inclined at an angle greater than the angle of repose of the material being fed in order to assure constant feeding of the entire hopper contents. A pressure fitting 61 in the head of pressure vessel 26 is connected to the valve 60 by a length of flexible tubing 62. A gas conduit 63 connects the free space above the powder in the upper pressure compartment of the dispensing unit with the free space above the powder in the auxiliary hopper 55. A shutoff valve 65 is inserted in this interconnecting line 63. The pressure will equalize in the two hoppers when the valve 65 is open, and when the valves 60 and 65 are closed the hoppers are isolated from one another. A pressure gage 66 indicates the pressure in the auxiliary hopper and pressure gage 67 indicates the pressure in the dispenser hopper. A blowoff valve 68 permits the pressure in the auxiliary hopper to be relieved. A relief valve 70 provides for the blowoff of excessive pressure in the entire system. An auxiliary gas supply pipe 71 is provided so that during the operation of the system should a large volume of gas be required to rapidly raise the pressure in the auxiliary hopper 55 there will be no danger of the flow of gas in the dispenser mixing and pressure equalizing conduit being reduced or reversed to cause the feed of powdered material from the system to be interrupted. A shutoff valve 72 may be provided in this line but is not required.

The auxiliary hopper makes possible continuous operation of this unit in the following manner. The dispenser hopper and the auxiliary hopper are initially filled with powdered material. The dispenser hopper of course must not be filled in such a manner that the powdered material is permitted to overflow in the open end of the dispenser mixing and pressure equalizing conduit 50 (Figure 2). In the preferred mode of operation, valve 60 is closed and the gas is admitted to balance the pressure in the entire system. This is done by opening shutoff valves 20 and 65. When the supply of powdered material in the dispenser hopper begins to run low, valve 60 is opened and powdered material feeds down by gravity from the auxiliary hopper 55 to replenish the supply in the dispenser hopper 31. When the dispenser hopper is again filled to the desired level, valve 60 may be closed. If shutoff valve 65 is then closed and blowoff valve 68 opened, the pressure in the auxiliary hopper may be relieved without effecting the continuing functioning of the dispensing system. When the pressure has been relieved from the auxiliary hopper 55 the pressure lid 57 may be opened and the auxiliary hopper recharged with powdered material. The pressure lid is then replaced and shutoff valve 65 reopened permitting the pressure to build up again in the auxiliary hopper to the pressure of the entire dispensing system. This sequence of operations may be performed as often as necessary to permit continuous feeding of powdered material from the apparatus. It may be desirable in certain instances to provide windows in the dispenser hopper and/or the auxiliary hopper to permit the level of powder in the hopper to be observed. When the auxiliary hopper is being brought up to pressure after refilling, there may be considerable gas flow into the auxiliary hopper. Gas supply bypass 71 permits rapid build up of auxiliary hopper pressure without upsetting the normal flow pattern in the dispensing unit. While in the preferred form of this invention the powdered material flows by gravity from the auxiliary hopper to the dispenser hopper it is obvious that other means could be substituted.

A modification of the above-described apparatus suitable for uninterrupted operation involves the use of a plurality of auxiliary hoppers arranged to feed a single dispenser unit in the same manner as the single auxiliary hopper described herein. Whether a single auxiliary hopper be used or a plurality of auxiliary hoppers, the invention disclosed herein makes possible the use of a small and relatively inexpensive dispensing unit for handling large quantities of powdered material in a continuous operation.

I claim:

Apparatus for continuously feeding powdered material into a flowing gas stream at superatmospheric pressure which comprises a first pressurized powder hopper, means for discharging powder from the bottom of said hopper through a substantially horizontal channel into a vertical conduit, means in said vertical conduit above the intersection of said channel and said conduit for supplying gas from a source of gas at superatmospheric pressure for mixture with said powder in said vertical conduit and delivery therefrom through the lower end of said conduit, conduit means providing communication between said vertical conduit at a point above the intersection of said channel and said conduit and the free space above the powder in said pressurized powder hopper to provide balanced pressure above and below the powder in said hopper at all times during operation, a second pressurized hopper above said first hopper, pressure tight conduit means including a valve connecting the bottom of said second hopper and the top of said first hopper, for the flow of powder from said second hopper to said first hopper, pressure tight conduit means including a valve placing the free volume above the powder in said first hopper in communication with the free volume above said powder in the second hopper to balance the pressure in said two hoppers prior to transfer of materail from said second hopper to said first hopper, and means for providing gas at superatmospheric pressure directly to said free volume in said second hopper from said source of gas at superatmospheric pressure whereby the pressure in said second hopper can be built up rapidly by the admission thereto of gas directly from said source without causing a substantial pressure drop in said first hopper and without reducing the downward flow of gas in said vertical conduit from said gas inlet to said outlet.

References Cited in the file of this patent
UNITED STATES PATENTS

| | | |
|---|---|---|
| 864,471 | Kelley | Aug. 27, 1907 |
| 931,579 | Donblet | Aug. 17, 1909 |
| 1,605,732 | Hoevel | Nov. 2, 1926 |
| 2,594,072 | Ridley | Apr. 22, 1952 |